US006256136B1

(12) United States Patent
Hunt

(10) Patent No.: US 6,256,136 B1
(45) Date of Patent: Jul. 3, 2001

(54) PIXEL BASED GOBO RECORD CONTROL FORMAT

(75) Inventor: Mark Hunt, Derby (GB)

(73) Assignee: Light & Sound Design, Ltd., Birmingham (GB)

( * ) Notice: Subject to any disclaimer, the term of this patent is extended or adjusted under 35 U.S.C. 154(b) by 0 days.

(21) Appl. No.: 09/500,393

(22) Filed: Feb. 8, 2000

Related U.S. Application Data

(63) Continuation of application No. 09/145,314, filed on Aug. 31, 1998, now Pat. No. 6,057,958.

(60) Provisional application No. 60/065,133, filed on Nov. 12, 1997, and provisional application No. 60/059,161, filed on Sep. 17, 1997.

(51) Int. Cl.[7] .................................................... G02B 26/00

(52) U.S. Cl. .......................... 359/291; 345/418; 345/431; 382/162; 382/181; 348/26; 348/110; 364/148; 364/188

(58) Field of Search ............................ 359/291; 345/418, 345/430, 431; 382/181, 162, 190; 348/110, 26, 649; 364/148, 188

(56) References Cited

U.S. PATENT DOCUMENTS 5,828,485 10/1998 Hewlett ................................ 359/291
5,852,443 * 12/1998 Kenworthy ........................... 345/431

* cited by examiner

*Primary Examiner*—Loha Ben
(74) *Attorney, Agent, or Firm*—Fish & Richardson P.C.

(57) ABSTRACT

A special record format used for commanding light pattern shapes and addressable light pattern shape generator. The command format includes a first part which commands a specified gobo and second parts which command the characteristics of that gobo. The gobo is formed by making a default gobo based on the type and modifying that default gobo to fit the characteristics.

111 Claims, 6 Drawing Sheets

1 2 3 4 5 6 7 8

PIXEL BASED GOBO RECORD CONTROL FORMAT

This is a continuation of U.S. application Ser. No. 09/145,314, filed Aug. 31, 1998, now U.S. Pat. No. 6,057, 958, which claims priority from provisional application No. 60/059,161, filed Sep. 17, 1997; and, provisional application No. 60/065,133, filed Nov. 12, 1997.

FIELD

The present invention relates to a system of controlling light beam pattern ("gobo") shape in a pixilated gob0 control system.

BACKGROUND

Commonly assigned patent application Serial No. 08/854, 353, now U.S. Pat. No. 6,188,933, the disclosure of which is herewith incorporated by reference, describes a stage lighting system which operates based on computer-provided commands to form special effects. One of those effects is control of the shape of a light pattern that is transmitted by the device. This control is carried out on a pixel-by-pixel basis, hence referred to in this specification as pixilated. Control is also carried out using an x-y controllable device. The preferred embodiment describes using a digital mirror device, but other x-y controllable devices such as a grating light valve, are also contemplated.

The computer controlled system includes a digital signal processor 106 which is used to create an image command. That image command controls the pixels of the x-y controllable device to shape the light that it is output from the device.

The system described in the above-referenced application allows unparalleled flexibility in selection of gobo shapes and movement. This opens an entirely new science of controlling gobos. The present inventors found that, unexpectedly, even more flexibility is obtained by a special control language for controlling those movements.

SUMMARY

The present disclosure defines a way of communicating with an x-y controllable device to form special electronic light pattern shapes. More specifically, the present application describes using a control language to communicate with an electronic gobo in order to reposition part or all of the image that is shaping the light.

BRIEF DESCRIPTION OF THE DRAWINGS

These and other aspects of the invention will now be described with reference to the attached drawings, in which.

DESCRIPTION OF THE PREFERRED EMBODIMENT

Figure 1:
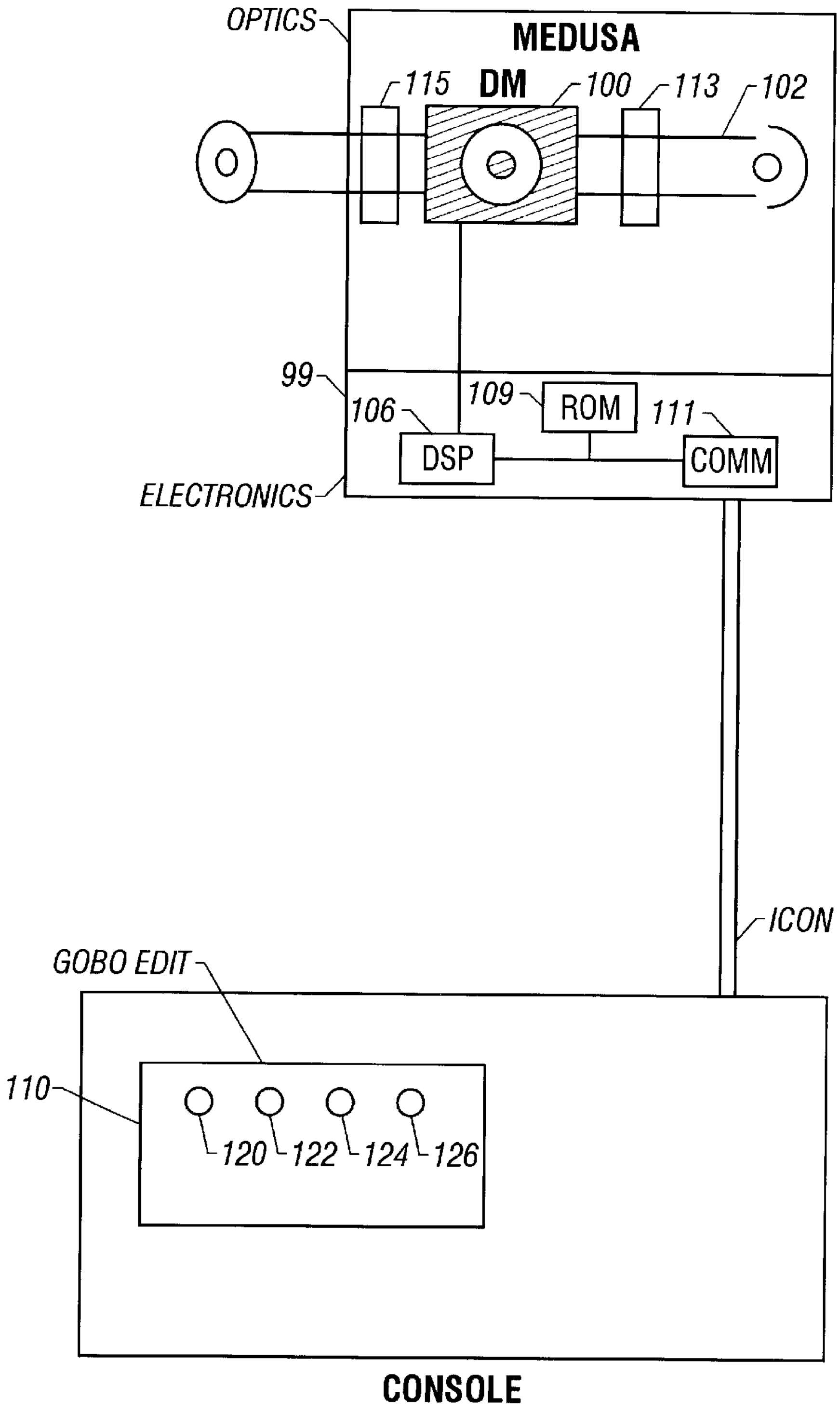
FIG. 1 shows a block diagram of the basic system operating the embodiment.

FIG. 1 shows a block diagram of the hardware used according to the preferred embodiment. As described above, this system uses a digital mirror device 100, which has also been called a digital mirror device ("DMD") and a digital light processor device ("DLP"). More generally, any system which allows controlling shape of light on a pixel basis, including a grating light valve, could be used as the light shaper. This light shaper forms the shape of light which is transmitted. FIG. 1 shows the light being transmitted as 102, and shows the transmitted light. The information for the digital mirror 100 is calculated by a digital signal processor 106. Information is calculated based on local information stored in the lamp, e.g., in ROM 109, and also in information which is received from the console 104 over the communication link.

The operation is commanded according to a format.

The preferred data format provides 4 bytes for each of color and gobo control information.

The most significant byte of gobo control data, ("dfGobo") indicates the gobo type. Many different gobo types are possible. Once a type is defined, the gobo formed from that type is represented by a number. That type can be edited using a special gobo editor described herein. The gobo editor allows the information to be modified in new ways, and forms new kinds of images and effects.

The images which are used to form the gobos may have variable and/or moving parts. The operator can control certain aspects of these parts from the console via the gobo control information. The type of gobo controls the gobo editor to allow certain parameters to be edited.

The examples given below are only exemplary of the types of gobo shapes that can be controlled, and the controls that are possible when using those gobo shapes. of course, other controls of other shapes are possible and predictable based on this disclosure.

A first embodiment is the control of an annulus, or "ring" gobo. The DMD 100 in FIG. 1 is shown with the ring gobo being formed on the DMD. The ring gobo is type 000A. When the gobo type 0A is enabled, the gobo editor 110 on the console 104 is enabled and the existing gobo encoders 120, 122, 124, and 126 are used. The gobo editor 110 provides the operator with specialized control over the internal and the external diameters of the annulus, using separate controls in the gobo editor.

The gobo editor and control system also provides other capabilities, including the capability of timed moves between different edited parameters. For example, the ring forming the gobo could be controlled to be thicker. The operation could then effect a timed move between these "preset" ring thicknesses. Control like this cannot even be attempted with conventional fixtures.

Another embodiment is a composite gobo with moving parts. These parts can move though any path that are programmed in the gobo data itself. This is done in response to the variant fields in the gobo control record, again with timing. Multiple parts can be linked to a single control allowing almost unlimited effects.

Another embodiment of this system adapts the effect for an "eye" gobo, where the pupil of the eye changes its position (look left, look right) in response to the control.

Yet another example is a Polygon record which can be used for forming a triangle or some other polygonal shape.

The control can be likened to the slider control under a QuickTime movie window, which allows you to manually move to any point in the movie. However, our controls need not be restricted to timelines.

Even though such moving parts are used, scaling and rotation on the gobo is also possible.

The following type assignments are contemplated:

00-0F=FixedGobo (with no "moving parts")

10-1F=SingleCntrl (with 1"moving part")

20-2F=DoubleCntrl (with 2"moving parts")

30-FF=undefined, reserved.

The remaining control record bytes for each type are defined as follows:

| Byte: | dfGobo2 | dfGobo3 | dfGobo4 | #gobos/type, | total memory |
|---|---|---|---|---|---|
| FixedGobo: | ID[23:16] | ID[15:8] | ID[7:0] | 16M/type | 256M |
| SingleCntrl: | ID[15:8] | ID[7:0] | control #1 | 64k/type | 1M |
| DoubleCntrl: | ID[7:0] | control #2 | control #1 | 256/type | 4k |

As can be seen from this example, this use of the control record to carry control values does restrict the number of gobos which can be defined of that type, especially for the 2-control type.

Console Support:

The use of variant part gobos requires no modifications to existing console software for the ICON (7M) console. The Gobo editor in current ICON software already provides 4 separate encoders for each gobo. These translate directly to the values of the 4 bytes sent in the communications data packet as follows:

| Byte: | dfGobo | dfGobo2 | dfGobo3 | dfGobo4 |
|---|---|---|---|---|
| Enc: | TopRight | MidRight | BotRight | BotLeft |
| FixedGobo: | | ID[23:16] | ID[15:8] | ID[7:0] |
| SingleCntrl: | | ID[15:8] | ID[7 0] | control #1 |
| DoubleCntrl: | | ID[7:0] | control #2 | control #1 |

These values would be part of a preset gobo, which could be copied as the starting point.

Once these values are set, the third and fourth channels automatically become the inner/outer radius controls. Using two radii allows the annulus to be turned "inside out".

Each control channel's data always has the same meaning within the console. The console treats these values as simply numbers that are passed on. The meanings of those numbers, as interpreted by the lamps change according to the value in dfGobo.

The lamp will always receives all 4 bytes of the gobo data in the same packet. Therefore, a "DoubleCntrl" gobo will always have the correct control values packed along with it.

Hence, the console needs no real modification. If a "soft" console is used, then name reassignments and/or key reassignments may be desirable.

Timing:

For each data packet, there is an associated "Time" for gobo response. This is conventionally taken as the time allotted to place the new gobo in the light gate. This delay has been caused by motor timing. In this system, variant gobo, the control is more dynamically used. If the non-variant parts of the gobo remain the same, then it is still the same gobo, only with control changes. Then, the time value is interpreted as the time allowed for the control change.

Since different gobo presets (in the console) can reference the same gobo, but with different control settings, this allows easily programmed timed moves between different annuli, etc. Internal Workings:

When the gobo command data is extracted from the packet at the lamp, the dfGobo byte is inspected first, to see if either dfGobo3 or dfGobo4 are significant in selecting the image. In the case of the "Cntrl" variants, one or both of these bytes is masked out, and the resulting 32-bit number is used to search for a matching gobo image (by Gobo __1D) in the library stored in the lamp's ROM 109.

If a matching image is found, and the image is not already in use, then the following steps are taken:

1) The image data is copied into RAM, so that its fields may be modified by the control values. This step will be skipped if the image is currently active.

2) The initial control values are then recovered from the data packet, and used to modify certain fields of the image data, according to the control records.

3) The image is drawn on the display device, using the newly-modified fields in the image data.

If the image is already in use, then the RAM copy is not altered. Instead, a time-sliced task is set up to slew from the existing control values to those in the new data packet, in a time determined by the new data packet. At each vertical retrace of the display, new control values are computed, and steps 2 (using the new control values) and 3 above are repeated, so that the image appears modified with time.

The Image Data Records:

All images stored in the lamp are in a variant record format:

Header:

Length 32 bits, offset to next gobo in list.

Gobo __1D 32 bits, serial number of gobo.

Gobo Records:

Length 32 bits, offset to next record.

Opcode 16 bits, type of object to be drawn.

Data Variant part—data describing object.

__Length 32 bits, offset to next record.

Opcode 16 bits, type of object to be drawn.

Data Variant part—data describing object.

__EndMarker 64 bits, all zeroes—indicates end of gobo data.

+Next gobo, or End Marker, indicating end of gobo list.

Gobos with controls are exactly the same, except that they contain control records, which describe how the control values are to affect the gobo data. Each control record contains the usual length and Opcode fields, and a field containing the control number (1 or 2).

These are followed by a list of "field modification" records. Each record contains information about the offset (from the start of the gobo data) of the field, the size (8, 16 or 32 bits) of the field, and how its value depends on the control value.

Length 32 bits, offset to next record

Opcode 16 bits=control_record (constant)

CntrlNum 16 bits=1 or 2 (control number)

/*field modification record #1 */

Address 16 bits, offset from start of gobo to affected field.

Flags 16 bits, information about field (size, signed, etc)

Scale 16 bits, scale factor applied to control before use zPoint 16 bits, added to control value after scaling.

/* field modification record #2 */

Address 16 bits, offset from start of gobo to affected field.

Flags 16 bits, information about field (size, signed, etc)

Scale 16 bits, scale factor applied to control before use zPoint 16 bits, added to control value after scaling.

As can be seen, a single control can have almost unlimited effects on the gobo, since ANY values in the data can be modified in any way, and the number of field modification records is almost unlimited.

Note that since the control records are part of the gobo data itself, they can have intimate knowledge of the gobo structure. This makes the hard-coding of field offsets acceptable.

In cases where the power offered by this simple structure is not sufficient, a control record could be defined which contains code to be executed by the processor. This code would be passed parameters, such as the address of the gobo data, and the value of the control being adjusted.

Example Records.

The Annulus record has the following format:

Length 32 bits

Opcode 16 bits, =type__annulus

Pad 16 bits, unused

Centre__x 16 bits, x coordinate of centre

Centre__y 16 bits, y coordinate of centre

OuterRad 16 bits, outside radius (the radii get swapped when drawn if their values are in the wrong order)

InnerRad 16 bits, inside radius

It can be seen from this that it is easy to "target" one of the radius parameters from a control record. Use of two control records, each with one of the radii as a target, would provide full control over the annulus shape.

Note that if the centre point coordinates are modified, the annulus will move around the display area, independent of any other drawing elements in the same gobo's data.

The Polygon record for a triangle has this format:

Length 32 bits

Opcode 16 bits, =type__polygon

Pad 16 bits, vertex count=3

Centre__x 16 bits, x coordinate of vertex

Centre__y 16 bits, y coordinate of vertex

Centre__x 16 bits, x coordinate of vertex

Centre__y 16 bits, y coordinate of vertex

Centre__x 16 bits, x coordinate of vertex

Centre__y 16 bits, y coordinate of vertex

It is easy to modify any of the vertex coordinates, producing distortion of the triangle.

The gobo data can contain commands to modify the drawing environment, by rotation, scaling, offset, and color control, the power of the control records is limitless.

Second Embodiment

This second embodiment provides further detail about implementation once the gobo information is received.

Figure 2:
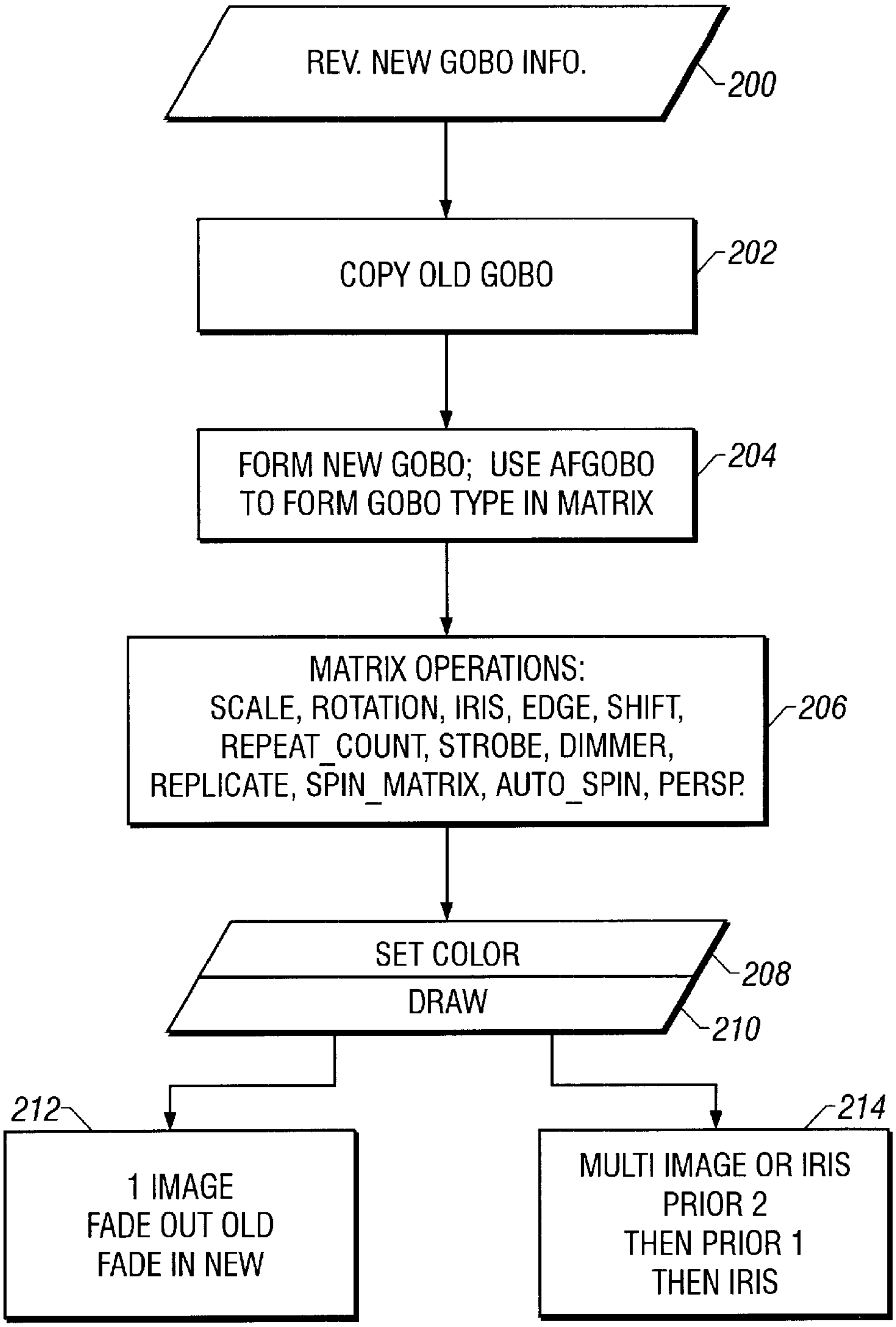
FIG. 2 shows a basic flowchart of operation.

Gobo information is, at times, being continuously calculated by DSP 106. The flowchart of FIG. 2 shows the handling operation that is carried out when new gobo information is received.

At step 200, the system receives new gobo information. In the preferred embodiment, this is done by using a communications device 111 in the lamp 99. The communications device is a mailbox which indicates when new mail is received. Hence, the new gobo information is received at step 200 by determining that new mail has been received.

At step 202, the system copies the old gobo and switches pointers. The operation continues using the old gobo until the draw routine is called later on.

At step 204, the new information is used to form a new gobo. The system uses a defined gobo ("dfGobo") as discussed previously which has a defined matrix. The type dfGobo is used to read the contents from the memory 109 and thereby form a default image. That default image is formed in a matrix. For example, in the case of an annulus, a default size annulus can be formed at position 0,0 in the matrix. An example of forming filled balls is provided herein.

Step 206 represents calls to subroutines. The default gobo is in the matrix, but the power of this system is its ability to very easily change the characteristics of that default gobo. In this embodiment, the characteristics are changed by changing the characteristics of the matrix and hence, shifting that default gobo in different ways. The matrix operations, which are described in further detail herein, include scaling the gobo, rotation, iris, edge, strobe, and dimmer. Other matrix operations are possible. Each of these matrix operations takes the default gobo, and does something to it.

For example, scale changes the size of the default gobo rotation rotates the default gobo by a certain amount Iris simulates an iris operation by choosing an area of interest, typically circular, and erasing everything outside that area of interest. This is very easily done in the matrix, since it simply defines a portion in the matrix where all black is written.

Edge effects carry out certain effects on the edge such as softening the edge. This determines a predetermined thickness, which is translated to a predetermined number of pixels, and carries out a predetermined operation on the number of pixels. For example, for a 50% edge softening, every other pixel can be turned off. The strobe is in effect that allows all pixels to be turned on and off at a predetermined frequency, i.e., 3 to 10 times a second. The dimmer allows the image to be made dimmer by turning off some of the pixels at predetermined times.

The replicate command forms another default gobo, to allow two different gobos to be handled by the same record. This will be shown with reference to the exemplary third embodiment showing balls. Each of those gobos is then handled as the same unit and the entirety of the gobos can be, for example, rotated. The result of step 206 and all of these subroutines that are called is that the matrix includes information about the bits to be mapped to the digital mirror 100.

At step 208, the system then obtains the color of the gobos from the control record discussed previously. This gobo color is used to set the appropriate color changing circuitry 113 and 115 in the lamp 99. Note that the color changing circuitry is shown both before and after the digital mirror 100. It should be understood that either of those color changing circuits could be used by itself.

At step 210, the system calls the draw routine in which the matrix is mapped to the digital mirror. This is done in different ways depending on the number of images being used. Step 212 shows the draw routine for a single image being used as the gobo. In that case, the old gobo, now copied as shown in step 202, is faded out while the new gobo newly calculated is faded in. Pointers are again changed so that the system points to the new gobo. Hence, this has the effect of automatically fading out the old gobo and fading in the new gobo.

Step 214 schematically shows the draw routine for a system with multiple images for an iris. In that system, one of the gobos is given priority over the other. If one is brighter than the other, then that one is automatically given priority. The one with priority 2, the lower priority one, is written first. Then the higher priority gobo is written. Finally, the iris is written which is essentially drawing black around the edges of the screen defined by the iris. Note that unlike a conventional iris, this iris can take on many different shapes. The iris can take on not just a circular shape, but also an elliptical shape, a rectangular shape, or a polygonal shape. In addition, the iris can rotate when it is non-circular so that for the example of a square iris, the edges of the square can actually rotate.

Returning to step 206, in the case of a replicate, there are multiple gobos in the matrix. This allows the option of spinning the entire matrix, shown as spin matrix.

Figure 4A:
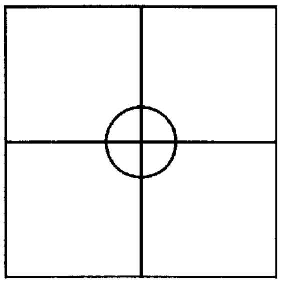
FIGS. 4A through 4G show respective interim results of carrying out the replicating circles operation.

An example will now be described with reference to the case of repeating circles. At step 200, the new gobo information is received indicating a circle. This is followed by the other steps of 202 where the old gobo is copied, and 204 where the new gobo is formed. The specific operation forms a new gobo at step 300 by creating a circle of size diameter equals 1000 pixels at origin 00. This default circle is automatically created. FIG. 4A shows the default gobo which is created, a default size circle at 00. It is assumed for purposes of this operation that all of the circles will be the same size.

Figure 3:
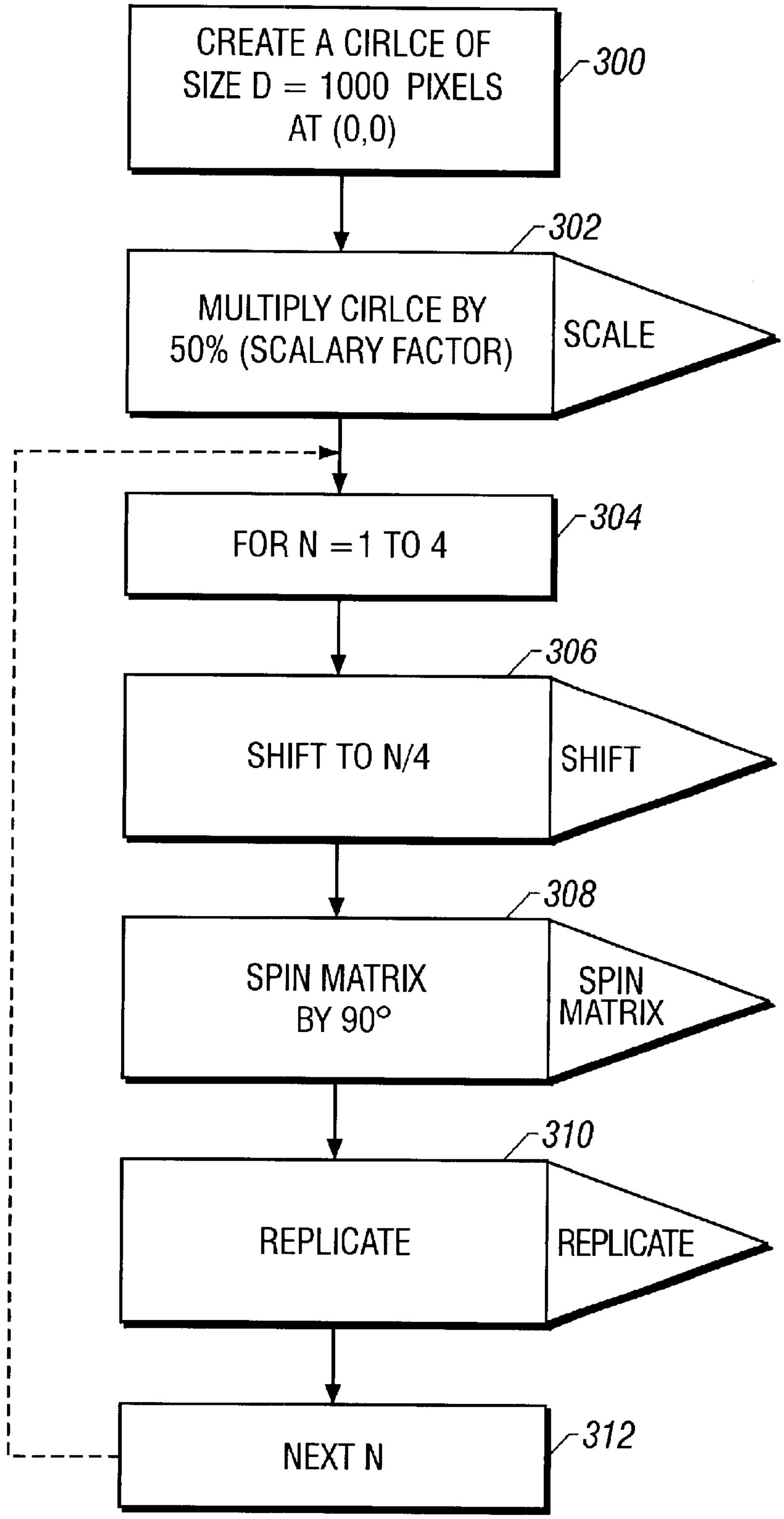
FIG. 3 shows a flowchart of forming a replicating circles type gobo.

At step 302, the circle is scaled by multiplying the entire circle by an appropriate scaling factor. Here, for simplicity, we are assuming a scaling factor of 50% to create a smaller circle. The result is shown in FIG. 4B. A gobo half the size of the gobo of FIG. 4A is still at the origin. This is actually the scale of the subroutine as shown in the right portion of step 302. Next, since there will be four repeated gobos in this example, a four-loop is formed to form each of the gobos at step 304. Each of the gobos is shifted in position by calling the matrix operator shift. In this example, the gobo is shifted to a quadrant to the upper right of the origin. This position is referred to as π over 4 in the FIG. 3 flowchart and results in the gobo being shifted to the center portion of the top right quadrant as shown in FIG. 4C. This is again easily accomplished within the matrix by moving the appropriate values. At step 308, the matrix is spun by 90 degrees in order to put the gobo in the next quadrant as shown in FIG. 4D in preparation for the new gobo being formed into the same quadrant. Now the system is ready for the next gobc, thereby calling the replicate command which quite easily creates another default gobo circle and scales it. The four-loop is then continued at step 312.

Figure 4E:
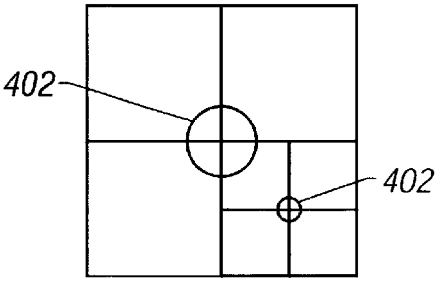
Figure 4B:
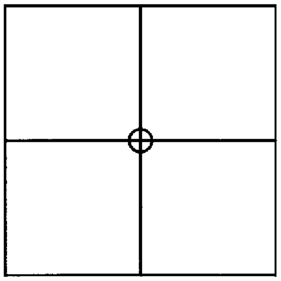
Figure 4F:
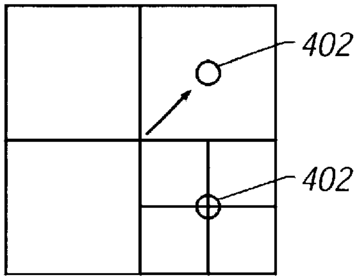
Figure 4C:
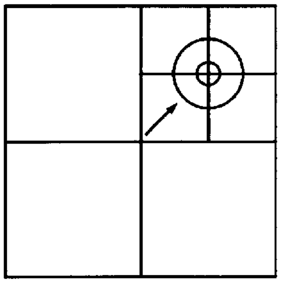
Figure 4G:
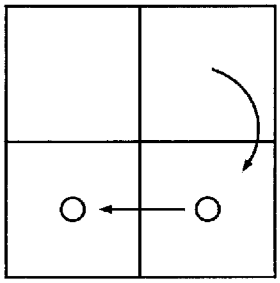
Figure 4D:
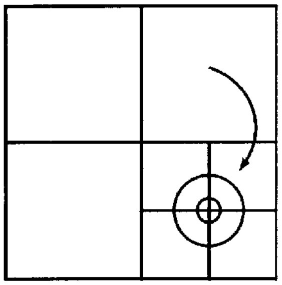

The replicate process is shown in FIG. 4E where a new gobo 402 is formed in addition to the existing gobo 400. The system then passes again through the four-loop, with the results being shown in the following figures. In FIG. 4F, the new gobo 402 is again moved to the upper right quadrant (step 306). In FIG. 4G, the matrix is again rotated to leave room for a new gobo in the upper right quadrant. This continues until the end of the four-loop. Hence, this allows each of the gobos to be formed.

Since all of this is done in matrix operation, it is easily programmable into the digital signal processor. While the above has given the example of a circle, it should be understood that this scaling and moving operation can be carried out for anything. The polygons, circles, annulus, and everything else is easily scaled.

The same operation can be carried out with the multiple parameter gobos. For example, for the case of a ring, the variable takes the form annulus (inner R, outer R, x and y). This defines the annulus and turns of the inner radius, the outer radius, and x and y offsets from the origin. Again, as shown in step 3, the annulus is first written into the matrix as a default size, and then appropriately scaled and shifted. In terms of the previously described control, the ring gobo has two controls: control 1 and control 2 defined the inner and outer radius.

Each of these operations is also automatically carried out by the command repeat count which allows easily forming the multiple position gobo of FIGS. 4A–4G. The variable auto spin defines a continuous spin operation. The spin operation commands the digital signal processor to continuously spin the entire matrix by a certain amount each time.

Figure 5:
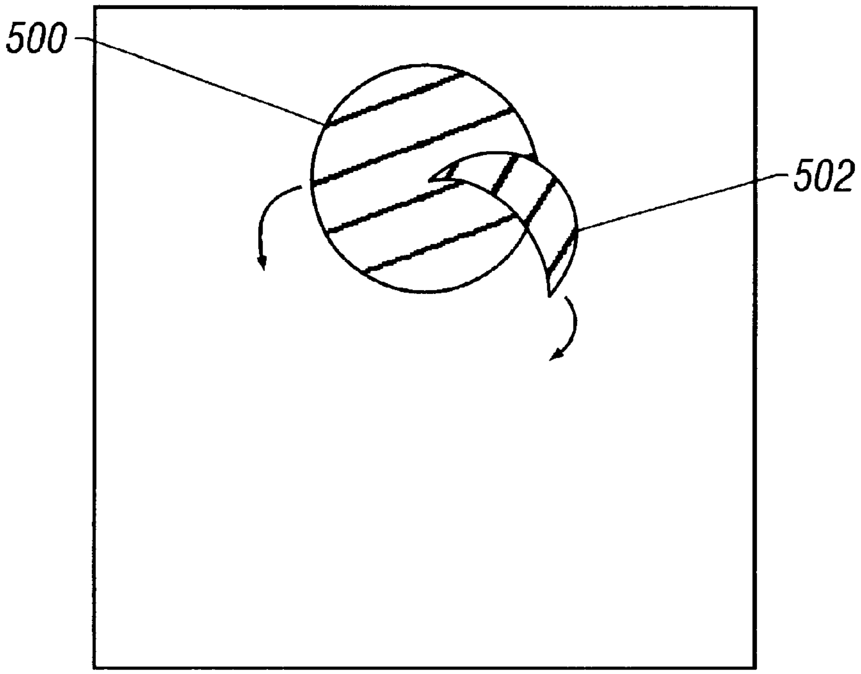
FIG. 5 shows the result of two overlapping gobos rotating in opposite directions.

One particularly interesting feature available from the digital mirror device is the ability to use multiple gobos which can operate totally separately from one another raises the ability to have different gobos spinning in different directions. When the gobos overlap, the processor can also calculate relative brightness of the two gobos. In addition, one gobo can be brighter than the other. This raises the possibility of a system such as shown in FIG. 5. Two gobos are shown spinning in opposite directions: the circle gobo 500 is spinning in the counterclockwise direction, while the half moon gobo 502 is spinning in the clockwise direction. At the overlap, the half moon gobo which is brighter than the circle gobo, is visible over the circle gobo. Such effects were simply not possible with previous systems. Any matrix operation is possible, and only a few of those matrix operations have been described herein.

Figure 6:
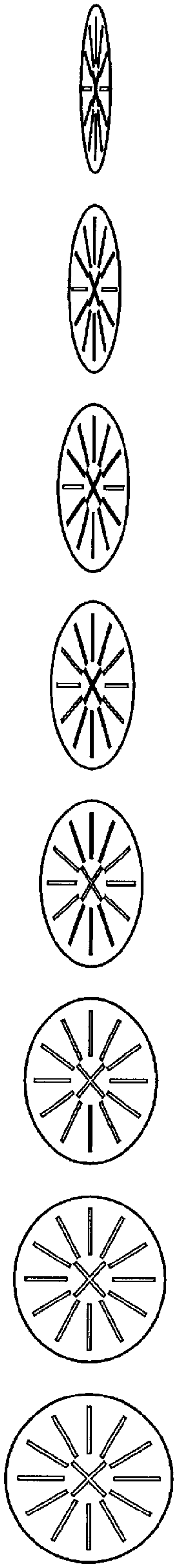
FIGS. 6(1) through 6(8) show a z-axis flipping gobo.

A final matrix operation to be described is the perspective transformation. This defines rotation of the gobo in the Z axis and hence allows adding depth and perspective to the gobo. For each gobo for which rotation is desired, a calculation is preferably made in advance as to what the gobo will look like during the Z axis transformation. For example, when the gobo is flipping in the Z axis, the top goes back and looks smaller while the front comes forward and looks larger. FIGS. 6(1)–6(8) show the varying stages of the gobo flipping. In FIG. 6(8), the gobo has its edge toward the user. This is shown in FIG. 6(8) as a very thin line, e.g., three pixels wide, although the gobo could be zero thickness at this point. Automatic algorithms are available for such Z axis transformation, or alternatively a specific Z axis transformation can be drawn and digitized automatically to enable a custom look.

Although only a few embodiments have been described in detail above, other embodiments are contemplated by the inventor and are intended to be encompassed within the following claims. In addition, other modifications are contemplated and are also intended to be covered.

What is claimed is:

1. A method of controlling an addressable light pattern generator, comprising:

defining a gobo type, that represents at least a pattern of a gobo represented by said gobo type, using information indicative of said type; and changing at least one value of the gobo represented by said type and providing a different display of said gobo, having the same general pattern, but having different values.

2. A method as in claim 1, wherein said type is represented by a number.

3. A method as in claim 1, wherein said value represents a size of a part of the gobo.

4. A method as in claim 1, wherein said value represents a number of parts of said gobo.

5. A method as in claim 1, wherein said gobo type represents a general outline of said gobo.

6. A method as in claim 1, wherein said gobo is a type which has a variable number of parts and said value represents said number of parts.

7. A method as in claim 1, wherein said gobo is a ring-shaped gobo.

8. A method as in claim 7, wherein said value is a size of a diameter of said gobo.

9. A method as in claim 1, wherein said gobo is a polygon.

10. A method as in claim 9, wherein said value represents a number of sides of said polygon.

11. A method as in claim 1, further comprising a type assignment which indicates a number of moving parts of said gobo.

12. A method as in claim 11, wherein said number of moving parts can be zero moving parts, one moving part, or two moving parts.

13. A method as in claim 1, further comprising commanding rotating the gobo.

14. A method as in claim 1, further comprising commanding scaling the gobo.

15. A method as in claim 1, further comprising commanding changing a color of the gobo.

16. A console having a first control part allowing selection of a gobo type and having a second control part allowing editing of a gobo selected by said gobo type.

17. A console as in claim 16, wherein said second control part enables gobo size to be edited.

18. A console as in claim 16, wherein said gobo type is one which has multiple parameters, and said second control part allows said multiple parameters to be edited.

19. A console as in claim 18, wherein said multiple parameters include inner and outer diameters which can be separately edited.

20. A console as in claim 16, wherein said gobo includes a variable number of parts and said second control part includes an editor for s aid number of parts.

21. A console as in claim 20, wherein said number of parts includes a number of actual shapes.

22. A console as in claim 20, wherein said number of parts includes a number of sides of a polygonal shape.

23. A console as in claim 16, wherein said second control part includes encoders which have functions that depend on the gobo number.

24. A console as in claim 16, further comprising a memory, storing gobo record images.

25. A console as in claim 24, wherein said gobo record images include a code representing a type of object to be drawn.

26. A console as in claim 16, further comprising a digital signal processor calculating gobo information.

27. A method comprising:

receiving digital information indicative of a gobo to be used to shape a light beam;

copying a current gobo being used and continuing to use the current gobo to shape the light beam;

using the information to form a new gobo; and switching from said old gobo to said new gobo to thereafter shape the light beam with said new gobo.

28. A method as in claim 27, further drawing the new gobo by forming a default image of a new gobo type.

29. A method as in claim 28, wherein said default image is formed of a default size and at a default position.

30. A method as in claim 27, comprising storing said gobo image in a matrix.

31. A method as in claim 28, comprising storing said gobo image in a matrix.

32. A method as in claim 31, further comprising changing the characteristics of the default gobo in the matrix.

33. A method as in claim 32, wherein said changing comprises scaling.

34. A method as in claim 32, wherein said changing comprises rotating.

35. A method as in claim 32, wherein said changing comprises applying an iris.

36. A method as in claim 32, wherein said changing comprises applying edge effects.

37. A method as in claim 32, wherein said changing comprises applying strobe information.

38. A method as in claim 32, wherein said changing comprises applying dimmer information to the matrix.

39. A method as in claim 32, wherein said changing comprises moving the image within the matrix.

40. A method as in claim 32, wherein said changing comprises replicating the gobo by forming another to default gobo, thereby providing multiple gobos handled by the same record.

41. A method as in claim 40, further comprising rotating all of the gobos.

42. A method as in claim 27, wherein said switching comprises fading out said old gobo while fading in said new gobo.

43. An apparatus comprising:

a first control element allowing selecting one of a plurality of gobos; and a second control element allowing selection of a number of times to replicate a selected gobo type.

44. An apparatus as in claim 43, further comprising a memory storing image information about the gobo.

45. An apparatus as in claim 44, further comprising a memory storing a matrix representation of the gobo.

46. An apparatus as in claim 44, wherein said image memory stores a default image of a default gobo.

47. An apparatus as in claim 46, further comprising another control enabling modifying the default image.

48. A method comprising:

selecting a shape of a light beam to be projected;

forming a record for said shape; and replicating said shape to provide more than one of said shapes, each of said more than one shape being handled by a single record.

49. A method as in claim 48, further comprising using said record to shape a beam of light.

50. A method as in claim 49, wherein the record includes a matrix which includes information about bits to be mapped to a digital gobo device.

51. A method as in claim 50, further comprising using a digital signal processor to carry out operations on the matrix, said operations including at least an operation of simulating a rotation of the image defined by the matrix.

52. A system as in claim 49, wherein the record further includes color information.

53. A method as in claim 48, wherein the record further includes information about a shape and size of an outside part of the beam being displayed.

54. A method as in claim 53, wherein said shape is an iris.

55. A method as in claim 48, further comprising commanding multiple gobos to spin in opposite directions.

56. A method as in claim 48, wherein said record defines two separate gobos.

57. A method of digitally cross-fading gobos in a stage light, comprising:

obtaining a first image to be used as a gobo;

obtaining a second image to be used as a second gobo; and fading said first gobo out while fading said second gobo in.

58. A method as in claim 57, wherein said first gobo is stored at a first location, said second gobo is stored at a second location and further comprising pointing to said first location while said first gobo is being used, and pointing to said second location while said second gobo is being used.

59. A method as in claim 57, wherein said first and second gobos have different outer shapes.

60. A method comprising:

defining gobo information indicating a default gobo;

selecting said default gobo to create a default image, of a specified size, at a default location, said image indicative of the gobo; and subsequently, after creating the default image, allowing the default image to be edited to form an edited gobo.

61. A method as in claim 60, further comprising projecting a light beam in the shape of the edited gobo.

62. A method as in claim 61, wherein said editing comprises changing the position of the gobo.

63. A method as in claim 62, wherein said editing comprises changing a size of the gobo.

64. A method as in claim 61, wherein said editing comprises changing a size of the gobo.

65. A method as in claim 61, further comprising replicating the default gobo to form an additional gobo.

66. A method as in claim 61, wherein said gobos are formed in memory within a matrix structure, and said editing comprises editing the matrix.

67. A method as in claim 66, wherein said editing comprises shifting the gobo to a specified position in the matrix, and forming another gobo at the default position.

68. A method as in claim 67, wherein said editing is carried out with a digital signal processor.

69. A method as in claim 61, wherein said gobos have multiple definable parameters, and said editing comprises allowing change of any of said parameters.

70. A method comprising:

obtaining a first image to be used as a gobo for projection of a light beam;

replicating said first image, to form multiple images based on the same base image; and using the multiple images to change a shape of the light beam.

71. A method as in claim 70, further comprising allowing any of the multiple images to be edited.

72. A method as in claim 71, wherein the editing comprises scaling.

73. A method as in claim 71, wherein the editing comprises shifting in position.

74. A method as in claim 71, wherein the image is represented by information in a matrix in memory, and wherein said editing comprises editing the matrix.

75. A method as in claim 74, further comprising rotating the image forming the gobo using matrix arithmetic to rotate the matrix.

76. A method as in claim 74, further comprising shifting a position of the image in the matrix using matrix arithmetic.

77. A record format, comprising:

a first part which indicates a type of gobo, wherein a first type of gobo has a different overall shape than a second type of gobo; and a second part which indicates controls to said first gobo, including at least a capability to control a moving part of said gobo, to scale a size of said gobo and to rotate said gobo.

78. A format as in claim 77, wherein said type of gobo includes an indication of whether the gobo is fixed, or has one or more controls.

79. A format as in claim 78, wherein said one or more controls comprises an indication that the gobo has only a single control or has a double control.

80. A method, comprising:

forming a first record which indicates a first image to be used as a first gobo that shapes output light;

forming a second record which indicates a second image to be used as a second gobo that shapes output light; and using said first and second images to form a composite shape of the output light.

81. A method as in claim 80, further comprising allowing said first and second image to be controlled totally separately.

82. A method as in claim 81, wherein said control comprises controlling said first gobo image to rotate in a first direction and controlling said second gobo image to rotate in a second direction opposite from said first direction.

83. A method as in claim 81, further comprising controlling a brightness of said first and second images at their overlap.

84. A method as in claim 83, wherein said controlling comprises calculating a relative brightness of the gobos at said overlap.

85. A method as in claim 83, wherein one of said gobos is visible at an intersection between said first and second gobos.

86. A method as in claim 83, wherein one of said gobos is brighter than the other of said gobos at the intersection to enable said one gobo to be seen over the other gobo.

87. A method comprising:

defining an image file representing a shape of light to be displayed;

changing said image file in a way to simulate depth and perspective to the image; and displaying light in a shape represented by the changed shape.

88. A method as in claim 87, wherein said changing comprises rotating the shape around an axis thereof.

89. A method as in claim 88, wherein said rotating in a way such that one part of the gobo appears to be move toward the viewer and another part of the gobo appears to move away from the viewer.

90. A method as in claim 88, wherein said rotating comprises rotating around the Z axis.

91. An apparatus, comprising:

a first pixel controllable device, which accepts commands indicating, on a pixel level, whether to pass light or not;

a digital signal processor, operating to calculate an image information for said pixel controllable device; and a memory, storing information about at least a plurality of gobo types, wherein said digital signal processor selects one of said gobo types from memory to display a gobo.

92. An apparatus as in claim 91, further comprising a communication device, receiving information indicative of a gobo to be selected.

93. An apparatus as in claim 92, wherein said digital signal processor is operative to retrieve said gobo information from said memory responsive to said information.

94. An apparatus as in claim 92, further comprising an operation console, coupled to said communication device, said operation console including controls for editing an image representing said gobo.

95. An apparatus as in claim 94, wherein said controls include encoders.

96. An apparatus as in claim 94, wherein said gobo type is represented by a number.

97. An apparatus as in claim 96, wherein said gobo type also include gobo edit information which indicates parameters of the gobo.

98. An apparatus as in claim 97, wherein said gobo edit information includes at least information indicative of a size of the gobo.

99. An apparatus as in claim 97, wherein said gobo edit information includes at least information indicative of a position of the gobo.

100. A device as in claim 97, wherein said gobo edit information includes at least information indicative of a rotation of the gobo.

101. A method comprising:

defining a first image which defines a first shape of light to be projected;

defining a second image which defines a second shape of light to be projected; and defining a timing of moving between said first and second shapes.

102. A method as in claim 101, wherein said first and second images comprise a first basic shape, and first and second parameters for said first basic shape.

103. A method as in claim 102, wherein said first basic shape includes a ring and said first and second parameters include a thickness of the ring.

104. A method as in claim 101, wherein said first and second images comprise a basic gobo shape with a moving part in a first position and a moving part in a second position.

105. A method as in claim 101, further comprising displaying light that is shaped by said images.

106. A method as in claim 101, wherein said first shape is a first polygon, and said second shape is a second polygon.

107. An apparatus, comprising:

a light controlling console which produces first values indicative of a type of light shape altering device, said first values being at a first location in a message sent by said light controlling console and which produces at least one second value indicative of said light shape; and a remote lamp, located remote from said console, and receiving said first and second values, and which processes said first values, and uses the result of processing said first values to determine the meaning of said second value.

108. An apparatus as in claim 107, wherein said second value represents size controls for said light shape.

109. An apparatus as in claim 107, wherein said second value represents position controls for said light shape.

110. An apparatus as in claim 107, wherein the message includes a plurality of parts including an indication of information about the light shape and control values packet along with the information about the light shape.

111. A system as in claim 107, wherein said second values includes timing information.

* * * * *